Patented Apr. 17, 1934

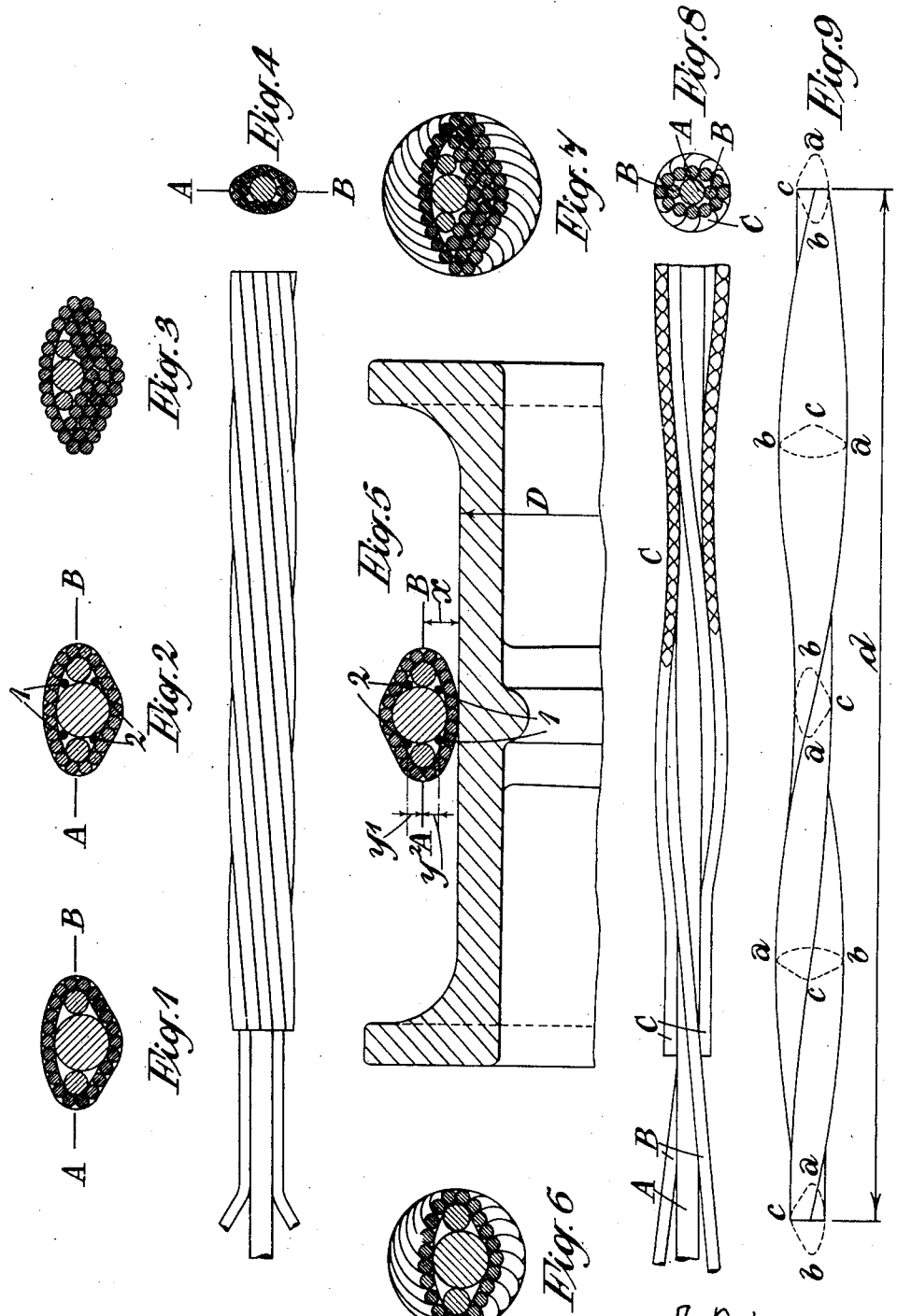

1,955,024

UNITED STATES PATENT OFFICE

1,955,024

ELECTRIC CABLE

Adolf Rohs, Kladno, Czechoslovakia, assignor to Felten & Guilleaume Carlswerk Actien-Gesellschaft, Cologne-Mulheim, Germany Application June 27, 1929, Serial No. 374,152
In Czechoslovakia July 3, 1928

3 Claims. (Cl. 117—58)

In the drawing:—

Figs. 1, 2, 3 and 4 show various forms of prior cables.

Fig. 5, shows a cross-section of a cable and take-up sheave.

Figs. 6, 7 and 8 are end views of my twisted and stranded conductors.

Fig. 9 shows the pitch of the helix which corresponds with the pitch or length of twist used in subsequent stranding of the conductors into a cable.

In order better to utilize the space within the lead sheathing of multiple-core cables, the individual conductors of the cable are made of sector shape. In most of the constructions of such sector shaped conductors, a core constituted by a plurality of parallel copper wires or strands is surrounded by one or more layers of stranded copper wires, as shown for example, in cross-section, in Figs. 1, 2 and 3 of the accompanying drawing. The wires shown on the outer periphery represent the stranded layer, while the inner wires which are not stranded together represent the core. A portion of a sector-shaped conductor made according to this known method is shown in Figure 4. Such a conductor is insulated either immediately upon the provision of the outer layers or subsequently by a separate operation in a manner well known in connection with electric cables.

If the stranding machine is provided with a comparatively small take-up sheave, difficulties are encountered during the winding and unwinding of the strand, all the wires or strands which constitute the core and do not lie in the neutral axis A—B of the cross-section (see Figs. 1 and 2) but a certain distance therefrom, becoming during the winding longer or shorter than the neutral axis of the conductor to be produced. The difference in length depends upon the distance of the parallel wires or strands of the core from the neutral axis A—B.

This will be more fully described with reference to Figure 5 which shows a take-up sheave with a conductor thereon which has the cross-section shown in Figure 2. Let $y$ represent in general the distance of the centre of the cross-section of any desired wire or strand belonging to the core of parallel wires or stands from the neutral axis A—B of the conductor. If the centres of the cross-sections of the wires or strands are at a distance from the surface of the take-up sheave which is greater or smaller by the value $y$ than the distance of the neutral axis A—B therefrom, then all the parallel wires or strands at a distance $y$ outside of the axis A—B are longer or shorter than the neutral axis of the completed conductor by the value $2\pi y$.

This difference of length may become very great in the case of large cross-sections. Let the wires or strands indicated by 1 and 2 in Fig. 5 be, for instance, at a distance $y_1=y_2=3$ mms. from the neutral axis. If the distance of the neutral axis from the periphery of the take-up sheave is $x=9$ mms. and the diameter of the take-up sheave D=1500 mms., then the shortening and lengthening of the wires 1 and 2 reaches the value of 18.8 mms. when the thickness of the conductor in the direction of the neutral axis is 4766 mms. No drawbacks are noticed as long as the conductor is on the take-up sheave. However, as soon as the conductor leaves the sheave and is stretched straight, the wires 1 in Fig. 5 are extended by 18.8 mms., which causes a change in the cross-section, while the wires 2 often push their superfluous length through the outer stranded layer, whereby the conductor is rendered useless.

Further, owing to their non-circular cross-sections, such conductors subsequently provided with an insulation can be stranded to a cable on the stranding machines only without using reverse rotation. However, in the stranding without reverse rotation, the individual conductors are twisted in themselves through an angle of 360° with each rotation of the stranding machine, whereby the copper conductor and the insulation of the individual conductors which is provided in layers in helical form, is subjected to mechanical stresses. The individual layers thereby become displaced and folded together, whereby the insulation is greatly impaired. It has often been endeavoured to overcome these difficulties by using a greater pitch than is desirable when the conductors are stranded together into a cable, in this case, however, especially when the cross-sections are large, the cable becomes rigid and cannot be bent. Further, in the case of large cross-sections, it is often very difficult to maintain the theoretically calculated diameter of the cable, since owing to the self-twist through an angle of 360° the conductors become so rigid and difficult to handle that often they obtain their correct position in the stranding die only by using force, whereby the insulation may become damaged. For this reason it is often necessary to use a slightly larger die than the calculated one, in order to prevent the insulation of the conductors being damaged.

The object of the present invention is to overcome this drawback. According to the invention are electrical stranded conductor of non-circular cross-section is manufactured, the longitudinal axis of which is straight and may be provided by a suitable core and the cross-section of which is built up from wires or strands twisted about the longitudinal axis of the conductor, the non-circular cross-section and the twist of the conductor being formed free from mechanical stresses on the conductor by the stranding of the wires or strands forming the cross-section of the conductor in one and the same operation. The twist which is imparted to the stranded conductor corresponds to the pitch, with which the individual conductors thus manufactured are stranded after their insulation into the complete cable. The copper conductor may be manufactured by stranding all the wires or strands forming the cross-section of the conductor or by stranding only some of the wires or strands forming the cross-section of the conductor, one or more covering layers of wires being provided on the core so formed with any desired pitch to form the desired cross-section of the conductor. Figures 6 and 7 show, by way of example, end views of such twisted and stranded conductors. Figures 8 and 9 illustrate, by way of example, in elevation such twisted conductors. In Figure 8 the outer layer of the conductor is shown partly in section. The pitch $d$ of the helix in Fig. 9 corresponds to the length of twist used in the subsequent stranding of the conductors into a cable.

As the core and consequently the complete conductor have a non-circular cross-section, the dies in which the twisting of the core and the stranding of the outer layers take place are arranged so as to be positively rotated. The rotation of the stranding head carrying the drums with the wires of the cores, and the rotation of the dies shaped to correspond to the non-circular cross-section of the conductors causes a twisted form to be imparted to the cable conductor without stressing the material of the latter. This is very important, since the complete cable thereby becomes more flexible.

The dies in which the twisting of the core and the stranding of the outer layers take place are rotated at the same speed and in the same direction as the stranding head carrying the drums with the wires or strands required for the formation of the core. The pitch to be given to the cable conductor depends upon the speed of the said head and dies as well as upon the drawing-off speed of the cable conductor, being indicated by $d$ in Figure 9.

The complete cable conductors preliminarily twisted according to the method described, are insulated in a known manner either immediately after the stranding of the outer layer or by a separate operation and are stranded together in known reversible laying machines. Small differences between the length of twist imparted to the conductor and that capable of being obtained in the stranding machine can be avoided by adjusting the reverse rotation of the latter machine.

The method according to the present invention avoids all the drawbacks referred to in the manufacture of cables having conductors of non-circular cross-section. Owing to the twist imparted to the conductors according to the method described and the use of reverse rotation, all mechanical stresses on the copper conductor and the insulation are avoided. The insulated cable conductors can easily be stranded in the dies and without using any force. In the method according to the invention the pitch of the cable can be kept smaller even in the case of large cross-sections.

What I claim is:

1. An electrical stranded conductor of non-circular cross-section having a core with its longitudinal axis lying in a straight line and the remaining wires forming a strand which is twisted about a core so that their non-circular cross-section makes one revolution about the core in a distance approximately equal to the pitch with which the strand is to be cabled.

2. An electrical stranded conductor as set forth in claim 1, the cross-section of which is sector shaped.

3. An electric stranded conductor of non-circular cross-section having its longitudinal axis lying in a straight line and its non-circular cross-section being formed by twisting the wires forming that strand about the longitudinal axis of the conductor so that their non-circular cross-section makes one revolution about the said axis in a distance approximately equal to the pitch with which the strand is to be cabled.

ADOLPH ROHS.